Figure 1:
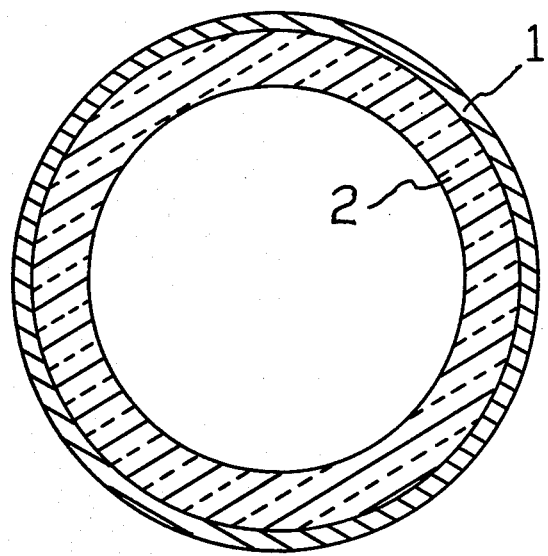

United States Patent [19]

Conant et al.

[11] 4,134,451

[45] Jan. 16, 1979

[54] HEAT EXCHANGER ELEMENTS AND OTHER CHEMICAL PROCESSING ELEMENTS COMPRISING METAL COATED, HEAT STABILIZED IMPERVIOUS GRAPHITE

[76] Inventors: Louis A. Conant, 218 Chapel Hill Dr., Rochester, N.Y. 14617; Wilbur M. Bolton, 162 Vollmar Pkwy., Rochester, N.Y. 14623; James E. Wilson, Box 123, Livonia, N.Y. 14487

[21] Appl. No.: 754,035

[22] Filed: Dec. 23, 1976

[51] Int. Cl.² .......................... B01J 1/00; B28F 21/02
[52] U.S. Cl. .................. 165/133; 165/180; 165/DIG. 8; 138/145; 427/250; 422/310
[58] Field of Search ............... 138/142, 143, 145, 172, 138/177; 165/133, 180; 220/63 R, 64; 215/12 R; 23/252 R; 428/36; 427/250

[56] References Cited

U.S. PATENT DOCUMENTS

| 242,471 | 6/1881 | Newton | 215/12 R |
|---|---|---|---|
| 1,070,995 | 8/1913 | Stern | 215/12 R |
| 2,143,156 | 1/1939 | Kennedy | 215/12 R |
| 3,132,979 | 5/1964 | Bickerdike | 138/177 X |
| 3,265,124 | 8/1966 | Reys | 428/36 X |
| 3,417,453 | 12/1968 | Clarke | 427/250 X |
| 3,568,723 | 3/1971 | Sowards | 138/177 X |
| 3,968,786 | 7/1976 | Spielberg | 138/145 UX |
| 3,980,105 | 9/1976 | Myskowski | 138/140 |

OTHER PUBLICATIONS

Impervious Graphite for Process Equipment Pts. 1 & 2, Schley, Chem. Engineering 2/18/74; 3/18/74 pp. 144–150; 102–110 respectively.
Graphite Heat Exchangers II-H11 pp. 116–119, Chemical Engineering 1/20/75.

*Primary Examiner*—Morris O. Wolk
*Assistant Examiner*—Michael S. Marcus
*Attorney, Agent, or Firm*—John T. Lewis

[57] ABSTRACT

Impervious graphite tubes, rings and other chemical processing structures made from impervious graphite can be improved with respect to impact strength, safety, shock resistance, pressure capability and heat transfer capability by partially thermally degrading impervious graphite structures and coating the outer surfaces of the treated graphite structures with a layer of metal at an elevated temperature. Upon cooling, the structure is under compression and has the improved properties. Structures are claimed comprising metal armored, partially thermally degraded impervious graphite.

13 Claims, 2 Drawing Figures

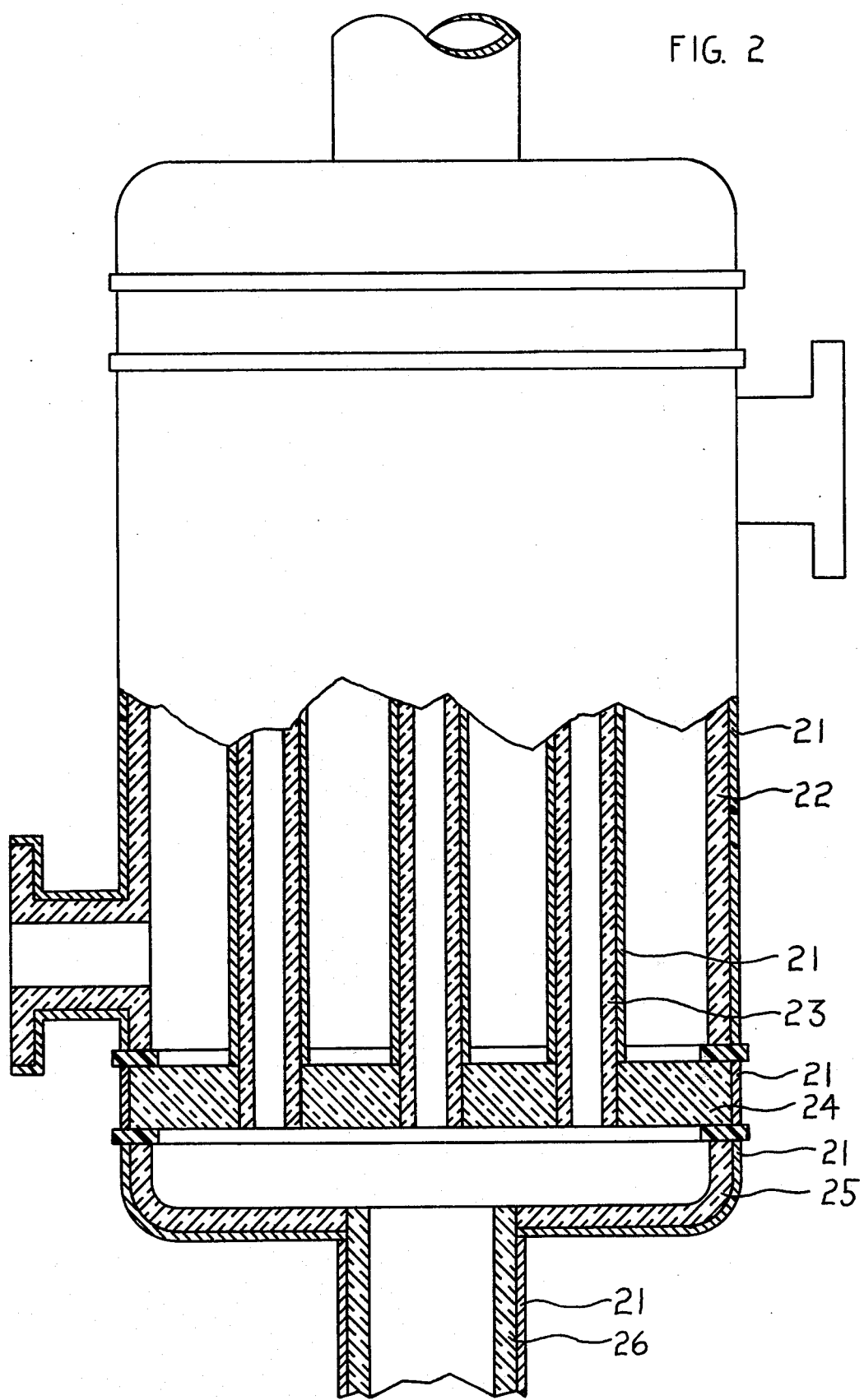

HEAT EXCHANGER ELEMENTS AND OTHER CHEMICAL PROCESSING ELEMENTS COMPRISING METAL COATED, HEAT STABILIZED IMPERVIOUS GRAPHITE

This invention is directed to tube-type heat exchanger and other chemical processing structures or elements. More particularly, this invention is directed to such processing structures which contain impervious graphite structures which have been heat stabilized and specially strengthened to obtain higher impact resistance, better safety properties, improved heat exchange characteristics, and better resistance to organic solvents and corrosive liquids. The processing structures of this invention comprise metal coated, heat stabilized (partially thermally degraded) impervious graphite hollow items such as tubes, pipes, rings and pump linings.

BACKGROUND

Impervious graphite heat exchange tubes, chemical piping and other equipment have a recognized position in commerce. Impervious graphite engineering materials have been described in many articles such as those entitled "Impervious Graphite for Processing Equipment", by John R. Schley in the journal *Chemical Engineering* (Feb. 18, 1974, pages 144–150 and Mar. 18, 1974, pages 102–110) and by Dennis G. Hills (Jan. 20, 1975, pages 116–119). From such publications it is evident that the term "impervious graphite" means graphite which has been manufactured (i.e. by molding or extrusion and subsequent heat treatment) into a desired form and then impregnated with a synthetic polymeric resin to make it impervious to gases and liquids. Processes for manufacturing impervious graphite structures are well known in the art, and need not be detailed here, except to point out for purposes of illustration that any synthetic resin which can be used to manufacture conventional impervious graphite heat exchange tubes can also be used in processes for manufacturing the metal coated, partially thermally degraded impervious graphite processing structures of this invention. Examples of such synthetic resins are the phenolic resins, epoxy resins, furan resins, polyester resins and polyfluoronated resins such as polytetrafluoroethylene resins. It is preferred, however, that the resins used in making the graphite impervious be of the thermosetting or chemical setting type, such as the phenolic resins, epoxy resins and furan type resins. Other resins can also be used, as desired, to make the graphite impervious, and the selection of which is within the ordinary skill of any heat exchange specialist or engineer and will depend largely upon the fluid(s) with which the graphite structure will be in contact in its intended use. (See the articles by Schley described above for a description of how conventional impervious graphite materials can be manufactured.)

Although in conventional practice, tubes and other forms of impervious graphite have somewhat improved mechanical properties over non-impervious or porous graphite, besides being impermeable, they nevertheless are weak and very brittle materials of construction. This is stated by Mills, and by Schley in the previously mentioned articles. for example, Schley states (*Chemical Engineering*, Feb. 18, 1974, page 150) "A crucial consideration in the success or failure of any impervious graphite structure is notch sensitivity." (Notch sensitivity is a characteristic of brittle materials which leads to catastrophic failure.) "In flexural tests, the strengths of notched specimens will be 35 to 40 percent less than similar specimens having no notch." This weak and brittle nature of impervious graphite imposes severe limitations on the design of equipment such as heat exchangers. More so since pressure tolerance is also low for conventional impervious graphite structures, being between about 50 and 75 psig for standard, commercially available heat exchange tubes. In describing shell and tube heat exchangers, Mills (page 82) states, "These designs take up a very large amount of valuable process space and are not recommended for use in the fine chemical and pharmaceutical industries." A further design limitation resides in the fact that impervious graphite is not metallic and therefor cannot be fastened by conventional welding or soldering methods and the like.

Since impervious graphite is notch sensitive and brittle, any surface defect becomes a potential failure point, and therefor is hazardous, particularly in chemical piping applications. Here, extremely hot and corrosove materials under pressure would be extremely dangerous if an impact caused a catastrophic failure.

The corrosion resistance of impervious graphite depends basically upon the inertness of graphite itself to most chemicals, except the resins used in filling the voids of graphite, which generally amounts to about 10 to 15 percent, reduce the corrosion resistance of the impervious graphite as well as its use at higher temperatures.

The resins primarily used in the manufacture of impervious graphite are the phenolics, epoxies and furans. These impose a temperature limit of about 340° F. on conventional structures which contain impervious graphite. If this temperature is exceeded in use, the resin begins to thermally degrade. These resins do not melt since they are of the thermosetting type, but instead become more brittle and harder by increased crosslinking, for example. This degradation continues with increased temperatures and time until charing occurs, and eventually the resin disintegrates. In the case of the phenolics, which are among the most widely used resins particularly for applications in which acids are present, the upper temperature limit is about 600° F., but for only very short periods of time. As the resin thermally degrades it becomes increasingly stable toward chemicals and therefore has enhanced corrosion resistance compared to ordinarily processed resins. However, since the heat stabilized resin also becomes much more brittle, thermal degradation ordinarily adversely affects the mechanical properties of the impervious graphite. Conventional impervious graphite structures and materials therefor have heretofor been limited to about 340° F. for ordinary use, since they are also already mechanically weak and notch sensitive.

It is therefor apparent that there has existed for some time a need in the chemical processing field for tubes, pipes, and the like having significantly improved chemical or corrosion resistance, having better impact strength (including resistance to, and freedem from, catastrophic explosive failure upon being ruptured), having better heat transfer properties, being more useful and safer in processes which involve higher pressures, having better resistance to mechanical shock, and having better resistance to attack by acids, organic solvents and other corrosive liquids and gases. It has now been discovered that these needs can be fulfilled by practicing the present invention as described hereinafter.

GENERAL DESCRIPTION OF THE INVENTION

This invention comprises heat exchanger elements and other chemical processing structures or elements comprising impervious graphite materials (made impervious by filling the voids of porous graphite with one or more appropriate synthetic resins) which impervious graphite materials:

(a) have been heat treated to partially thermally degrade the polymeric resin;
(b) have been externally armor coated at an elevated temperature with a thin layer of metal; and
(c) are under high compressive force (due to the differential thermal contraction of the layer of metal and the impervious graphite structure when the metal coated element is cooled to room temperature from an elevated temperature above about 200° C.).

DETAILS OF THE INVENTION

The metal armored, partially thermally degraded impervious graphite chemical processing structures of this invention can readily be manufactured by a three step procedure. The first step involves heat treating conventional impervious graphite in the desired form of the chemical process element to thereby partially thermally degrade the synthetic resin portion of the impervious graphite. The second step involves applying at an elevated temperature a relatively thin coating or layer of metal to the outside surface of the specially heat treated impervious graphite structure. The third step involves lowering the temperature of the resulting metal armored, heat-treated impervious graphite structure to ambient or "room temperature" conditions (i.e. about 25° C.).

In FIG. 1, which is a cross section of a heat exchange tube in accordance with this invention, 1 indicates the metal layer and 2 indicates impervious graphite.

In FIG. 2, which illustrates a heat exchanger, 21 is a layer of gas plated metal such as nickel, 22 is the shell of the heat exchanger, 23 is a metal coated, thermally degraded impervious graphite heat exchange tube, 24 is the tube sheet or manifold, to which tubes are secured by cement or by welding, 25 is a cover and 26 indicates the inlet to the heat exchanger.

In the following description, reference will be made to "tubes" or "heat exchange tubes", rather than referring specifically in each instance to all of the various physical forms the chemical processing structures or elements of this invention can assume or exist, such as pipes, pumps, rings and the like. It is intended that this description also apply to such other physical forms.

The heat treatment of impervious graphite tubes is undertaken in order to partially degrade the synthetic resin which is present in the pores of the graphite in order to reduce or eliminate the ordinary or "natural" porosity of the graphite. Ordinarily impervious graphite tubes contain from about 10 to about 15 weight percent of polymeric resin (to seal its pores), the remainder consisting essentially of graphite. Partial thermal degradation can be accomplished by heating the impervious graphite structures at a temperature of from about 180° C. to about 300° C. (or higher if desired) for a period of time (generally from about 3 hours to about 30 hours, depending on the temperature) sufficient to partially thermally degrade or heat stabilize the synthetic resin portion of the impervious graphite composition. The atmosphere in and around the article during the heat-treating step can be air or other gas such as nitrogen or carbon dioxide. Partial degradation of the synthetic resin portion is evidenced by a loss of weight of the heat-treated article during the heat-treating step of from about 0.25 to about 3 weight percent or more (as compared to the weight of the element after being dried at 110° C. but prior to the heat-treating step. It is essential that said synthetic resin portion be only partially thermally degraded, in order to retain the desired imperviousness of the graphite article. Partial thermal degradation of the synthetic resin portion apparently causes some charring and/or ablation of the resin portion without detracting substantially from the benefits which it has been discovered can result from practicing this invention.

The high temperature metal coating step of this process involves the application of a thin (from about 2 to about 100 mils of metal or more, and preferably from about 5 to about 50 mils) coating or layer of metal to the outer surface of the partially thermally degraded impervious graphite tube at an elevated temperature of from about 65° C. to about 450° C. (840° F.), and preferably between about 175° C. and about 300° C. in accordance with the metal coating method described in detail in our U.S. Pat. No. 4,072,243. The disclosure of said patent application is hereby incorporated by reference into the present application. A preferred coating is a gas plated (i.e. by chemical vapor deposition) nickel coating, having a thickness of from about 5 to about 50 mils. Such a metal coating is dense and continuous over substantially the entire external surface of the tube.

Cooling to room temperature of the resulting metal armor coated, partially thermally degraded impervious graphite article is preferably accomplished in an inert atmosphere and gradually, over a period of at least a few minutes, and preferably of at least about 15 minutes.

The resulting product is stronger, tougher, and much more impact resistant than ordinary impervious graphite tubes having the same physical measurements (wall diameters). Also the product is shatterproof and capable of being used under very high pressures, and does not rupture even if the graphite portion is "notched", badly cracked or broken. The reasons for such beneficial effects and others can be explained using the following considerations:

1. The metal coating strenthens the heat-treated impervious graphite tube by exerting a compressive force. The state of compression is accomplished by coating the tube with a layer of metal at an elevated temperature. In the case of nickel by vapor deposition (using nickel carbonyl), this elevated temperature is usually from about 200° F. to about 550° F. Since the coefficient of expansion of nickel ($7.7 \times 10^{-6}$ in/in/°F.) is about 6 times higher than that of graphite ($1.3 \times 10^{-6}$ in/in/° F.) and the modulus of elasticity about 3 times higher, the partially degraded impervious graphite is strongly compressed on cooling substantially, for example, to room temperature. This compressive force adds to the strength of the impervious graphite object itself. In the case of an aluminum metal coating, the coefficient of thermal expansion would be 10 times greater than that of graphite. Coating temperature for aluminum (by vapor deposition of diethyl aluminum hydride) can be as high as 750° F. By comparison, an electrodeposited nickel coating applied from a sulfamate bath, for example, would compress the graphite to a much smaller extent since the coating bath temperature is often as low as about 120° F. Impervious graphite heat exchange tubes coated with a nickel-phosphorus alloy from an electroless nickel bath generally operated at about 200° F. would be compressed more than those coated from an electrolytic sulfamate (nickel) bath, but its compressive strength would be considerably less than that made by coating nickel using nickel carbonyl gas at a temperature of 400° F., for example. An electroless nickel-boron coating bath can also be used. Such baths operate between 120° F. and 160° F. and so would produce metal coated partially degraded impervious graphite elements under compressive force which is intermediate between those made via use of the nickel-phosphorus and nickel-sulfamate baths. A combination of metals can be used if desired. For example, combinations of layers of gas plated nickel, electrolytic plated nickel or electroless plated nickel coatings (or all three) can be used. Examples of metals that can be used in the practice of this invention include nickel, iron, copper, aluminum, cobalt, chromium, molybdemum and various combinations thereof.

2. The metal coating also provides increased impact and shock resistance to the graphite object because the metal itself absorbs energy by deformation in the case of ductile metals such as nickel and aluminum and the like.

Still another advantage of metal armored partially degraded impervious graphite articles of this invention is the protection of the outer surfaces from scratches, abrasions, etc. This is particularly important since the slightest surface defect will often render a heat exchange tube or chemical piping unsafe for use, particularly where the use of pressure is contemplated.

Still another advantage of the metal armored partially thermally degraded impervious graphite tubes of this invention is the ease and flexibility with which they can be fastened, either to themselves or to metal headers, collars and the like. Thus, they can be readily welded, spot welded or silver soldered, for example, depending upon the selection of metals, without loss of their valuable properties. By comparison, conventional impervious graphite tubes are usually connected by cements, with careful precision being required for a strong bond.

Some of the conventional impervious graphite shortcoming are described by Hills in an article in the Dec. 23, 1974 issue of Chemical Engineering, at page 83:

"The limitations on this design are the pressure limits, which are relatively low. The highest recommended operating temperature is approximately 180° C. and the operating pressure 75 psig with liquids and up to 50 psig with steam."

Heat exchange tubes made of impervious graphite are made conventionally with very thick walls because of the low strength of the graphite. Thus, for heat exchange equipment in which there is pressure inside the tubes, conventional treatment requires a sacrifice of heat transfer capability due to the requisite thick tube walls. The present invention makes such sacrifice in heat transfer capability unneccssary, even though the basically graphite tubes are to be used under pressure. Also, the present invention makes it possible to use impervious graphite tubes in equipment which involves substantially higher pressures than was heretofore believed possible, not only without sacrificing any heat transfer capability, but actually gaining in heat transfer capability. Using the present invention, the walls of the graphite tubes can actually be made thinner than those used in conventional impervious graphite tube heat exchange practice, so long as the graphite remains thick enough and retains enough surface and porosity integrity to accomplish the desired degree of corrosion prevention. Impervious graphite pipe walls could be reduced in thickness by half or more when the pipe is nickel armored, for example, in accordance with this invention. Although impervious graphite has a higher thermal conductivity than nickel (975 vs 550), the decreased wall thickness of the pipes made possible by this invention would more than compensate, in view of the relatively thin metal coatings that are used, so that the combined thermal conductance of the thinner walled metal coated partially thermally degraded impervious graphite tubes or pipes would be higher than that of conventional impervious graphite tubes or pipes. Even though without changing the thickness of the carbon (or graphite) tube walls, the thin metal armor would detract very little from the thermal conductance property of the uncoated tubes. (See data in Table 1, below)

In the following table the term "Karbate" is used. "Karbate" is a trade name of Union Carbide Corporation and is applied to conventional impervious graphite articles. It is believed that the "Karbate" heat exchange tubes in these examples contain about 10 weight percent of a phenolic resin to impart imperviousness thereto. Data in Table 1 was obtained from a comparison of conventional impervious graphite tubes and tubes made according to the process described hereinafter under the heading "Manufacturing This Invention".

TABLE 1

| PIPE MATERIAL | WALL THICKNESS 1 IN | THERMAL CONDUCTIVITY k | CONDUCTANCE C = k/l | RATIO: NICKEL COATED UNCOATED PIPE |
|---|---|---|---|---|
| THERMAL CONDUCTANCES OF NICKEL ARMORED IMPERVIOUS GRAPHITE (KARBATE) VS UNCOATED IMPERVIOUS GRAPHITE[1] | | | | |
| Uncoated Impervious Graphite ⅜ In. Dia. | 3/16 (.1875") | 975 | 5200 | — |
| Nickel Armored Impervious Graphite ⅜ in. Pipe, 0.010 in. Nickel Coating | Graphite (.1875) Nickel (.0100) | 975 550 | Combined* 4752 | .914 |
| Impervious Graphite ½ Wall Thickness Armored With Nickel | Graphite (.09375) Nickel (.0100) | 975 550 | Combined* 8757 | 1.68 |

TABLE 1-continued
THERMAL CONDUCTANCES OF NICKEL ARMORED IMPERVIOUS GRAPHITE (KARBATE) VS UNCOATED IMPERVIOUS GRAPHITE[1]

| PIPE MATERIAL | WALL THICKNESS 1 IN | THERMAL CONDUCTIVITY k | CONDUCTANCE C = k/l | RATIO: NICKEL COATED UNCOATED PIPE |
|---|---|---|---|---|
| Impervious Graphite One Third Wall Thickness Armored With Nickel | Graphite (.0625) Nickel (.0100) | 975 550 | Combined* 12,165 | 2.34 |
| Impervious Graphite Pipe 6 In. Dia. | 0.750 | 975 | 1300 | — |
| Impervious Graphite Pipe 6 In. Dia. Armored With Nickel | Graphite (.250) Nickel (.010) | 975 550 | Combined* 3643 | 2.8 |

*Combined Conductance
C = 1/R$_t$ $$R_T = \frac{1}{k_c/l_c} + \frac{1}{k_{Ni}/l_{Ni}}$$ (1)

R$_t$ = Total Thermal Resistance
k$_c$ = Therm. cond. of graphite
K$_{Ni}$ = Therm. cond. of nickel
C = Conductance (1) The heat transfer capability of impervious graphite and that of partially degraded impervious graphite is essentially the same.

The data in Table 1 shows several significant things with respect to this invention. It illustrates that nickel armoring of a conventional impervious graphite heat exchange tube does not detract to a very great extent from the heat transfer capability of the impervious graphite tube. When the thickness of the tube wall is halved (which becomes practical because of our invention even in contemplated uses of the tubes in situations which involve high pressures.) and nickel armored, the thermal conductance of the resulting armored tube of the invention is about 1.7 times as high as that of the corresponding conventional impervious graphite tube and when tube wall thickness is reduced to one third that of conventional practice, the thermal conductance of the resulting armored tube of the invention is more than 2.3 times that of the corresponding conventional tube. These figures relate to smaller (⅜ inch) diameter tubes. When tubes of relatively larger diameter are used conventionally, wall thickness is increased. For example, the walls of ⅜ inch diameter Karbate tubes are 3/16 inches thick. Walls of 6 inch diameter Karbate heat exchange tubes are ¾ inch thick, and have thermal conductances which are only one third as high as those of ⅜ inch Karbate tubes. Thus, benefits in the form of remarkably improved thermal conductance can readily be appreciated from practicing this aspect of the present invention.

Although the strength, impact resistance and pressure tolerance of conventional heat exchange tubes would be drastically reduced if they were used with thinner walls as shown in Table 1, the metal armor coating more then compensated for this loss in properties. Actually the nickel armored tubes illustrated are far superior to conventional impervious graphite tubes of corresponding size in many properties and attributes, including impact strength, pressure tolerance, and resistance to catastrophic rupture (safety). Regarding the safety aspect of the structures of this invention, it should be noted that when a metal armored, partially thermally degraded impervious graphite tube of this invention is struck with a sufficiently hard blow, the graphite will fracture generally at the point of impact with the fractured graphite composition being converted to fine particles which have extremely low kinetic energy. By comparison, fractured conventional impervious graphite tubes under pressure fracture and shatter into relatively large, multi-sized pieces, which can be dangerous, like shrapnel. The benefit of this aspect of this invention is due to the compressive force or condition in which the graphite composition exists during use. The tubes and other structures of our invention should be used at temperatures substantially below that at which the metal armor layer is applied in order to fully appreciate this aspect of the invention.

Still another advantage of the metal coated, partially thermally degraded impervious graphite tubes of this invention is their improved resistance to the action of organic solvents and corrosive liquids and gases. Thus, it has been found that the partial thermal degradation of the synthetic resin portion of impervious graphite imparts improved resistance of the resin portion to such corrosive and/or solubilizing media, so that the pores in the graphite remain impervious even after prolonged contact with such media. Apparently the improved resistance results from physical and chemical changes that occur in said resin portion during the partial thermal degradation step, such as more extensive cross-linking of molecules in the resins and partial charing or ablation and restructuring of the synthetic resins. It is also believed surprising that, although polymeric resin portions of the impervious graphite compositions have been partially thermally degraded, they retain their capacity or capability of making the otherwise very porous graphite impervious to gases and liquids.

MANUFACTURING THIS INVENTION

An impervious graphite tube (Karbate No. 22) containing a phenolic resin, with dimensions of 1¼ in.o.d. by ⅞ in. i.d. by 12 in. long was cleaned with isopropyl alcohol, mounted on a holder for gas plating, and then sealed at both ends with a steel plate and Teflon gasket. It was fastened by a steel rod that passed through the center of the tube. The bottom steel plate had two copper tubes silver soldered to it to thereby provide inlet and outlet tubes for the heat transfer fluid. The resulting assembly was placed in an oven for partial thermal degradation of the resin portion. The oven was heated to 250° F. for 1 hour, 300° F. for 2 hours, for 3 hours at 350° F., 400° F. for 4 hours, 450° F. for 16 hours, and 500° F. for 4 hours. It was cooled to room temperature slowly and then placed in a gas plating chamber.. Slightly more than 1 weight percent of the tube weight was lost in the heat-treating step.

The copper tubes of the fixture were then connected to a heat exchanger which uses a polyalkylene glycol fluid (Ucon HTF 14). The plating cycle was started by purging the chamber of air with pressurized nitrogen, and at a chamber pressure of 5 in. water pressure. After 30 minutes the tube was heated by pumping heat transfer fluid through it. The tube was heated to 435° F. and nickel carbonyl (in a carbon dioxide carrier gas) was admitted. Plating lasted 1¼ hours and a coating 0.010 in. thick was made on the tube. The chamber was then purged with nitrogen and the sample removed and cooled slowly to room temperature.

The sample was hydrostatically tested at 1000 psig and found to be impervious.

Impact tests were made as follows on nickel-coated partially thermally degraded impervious graphite tubes made in this way, and on unprocessed commercially available Karbate tubes with the results as set out in Table 2.

Impact tests were made by dropping a ½ lb. steel ball onto the tube from a measured height to give impact strength in inch-pounds.

Table 2

| Tube | Impact Strength (in.-lbs.) | Remarks |
| --- | --- | --- |
| Nickel armored tube of our invention | >55 | OK |
| Conventional Tube | <5 | Shattered |
| Nickel armored tube of our invention | >52 | OK |
| Conventional Tube | <4 | Shattered |

This invention is also applicable to structures which are non-symmetrical or even intricate, such as specially shaped parts for pumps. Thus, the invention includes metal clad or armored, partially thermally degraded impervious graphite structures that cannot be manufactured by known methods, such as by heat shrinking metal coatings on the outer surface of the structure.

What is claimed is:

1. In a heat exchanger or chemical processing structure comprising an impervious graphite tube made impervious by filling the voids of a porous graphite tube with a synthetic resin, the improvement which comprises said impervious graphite tube having a layer of metal over the outer surface of said tube and being under high compression at room temperature due to said layer of metal having been applied to said outer surface of said tube at an elevated temperature by vapor deposition, and the synthetic resin portion of said impervious graphite tube being partially thermally degraded by heat treating said impervious graphite tube at a temperature above about 180° C. for a period of time sufficient for said tube to lose from about 0.25 to about 3 percent of its weight; whereby the metal armored partially thermally degraded impervious graphite tube has higher shock resistance, substantially increased pressure tolerance and an impact strength at least 5 times greater than that of otherwise smaller uncoated impervious graphite tubes in which the synthetic resin portion is not partially thermally degraded.

2. A metal armored, partially thermally degraded impervious graphite tube as in claim 1, wherein said layer of metal has a thickness of from about 5 mils to about 100 mils.

3. A metal armored, partially thermally degraded impervious graphite tube as in claim 2, wherein said metal is selected from the group consisting of nickel, copper, aluminum, cobalt, chromium, iron, silver, molybdemum and mixtures thereof.

4. A metal armored, partially thermally degraded impervious graphite tube as in claim 3, wherein said synthetic resin is selected from the group consisting of polyesters, phenolics, epoxies, furans, and polyfluorinated alkylenes.

5. A metal armored, partially thermally degraded impervious graphite tube as in claim 4, wherein said synthetic resin is selected from the group consisting of phenolic resins, epoxy resins, and furan resins.

6. A metal armored, partially thermally degraded impervious graphite tube as in claim 5, wherein said synthetic resin is a phenolic resin.

7. A metal armored, partially thermally degraded impervious graphite tube as in claim 4, wherein said synthetic resin is a thermosetting resin.

8. A metal armored, partially thermally degraded impervious graphite tube as in claim 4, wherein said layer of metal is a layer of nickel.

9. A metal armored, partially thermally degraded impervious graphite tube as in claim 8, wherein the thickness of said layer of nickel is from about 5 to about 50 mils.

10. A metal armored, partially thermally degraded impervious graphite chemical processing structure having a layer of gas plated metal over the outer surface of said structure, said structure containing partially thermally degraded synthetic resin in the pores of said graphite and being under high compression at room temperature caused by said layer of metal having been applied to the outer surface of said structure at an elevated temperature above about 175° C.; said metal armored, partially thermally degraded impervious graphite structure having higher shock resistance, and substantially increased pressure tolerance as compared to an otherwise similar uncoated impervious graphite structure which contains undegraded synthetic resin, and having an impact strength at least about 5 times that of said otherwise similar structure, and said impervious graphite having been partially degraded by a heat treating step wherein said impervious graphite is heated at a temperature between about 180° C. and about 300° C. for a period of time sufficient for said impervious graphite to lose from about 0.25 to about 3 percent of its weight.

11. A chemical processing structure as in claim 10, in the form of a tube or pipe, wherein said synthetic resin is a phenolic resin and said metal is nickel.

12. A tube or pipe as in claim 11, wherein the thickness of said layer of metal is from about 5 to about 100 mils.

13. A tube or pipe as in claim 12, wherein said layer of nickel is a layer of gas plated nickel.

* * * * *